US012706901B2

(12) United States Patent
Rule et al.

(10) Patent No.: US 12,706,901 B2
(45) Date of Patent: Aug. 11, 2026

(54) SYSTEMS AND METHODS FOR AUTHENTICATING NETWORK OPERATIONS VIA DYNAMIC SELECTION OF ACCESS TOKENS

(71) Applicant: Capital One Services, LLC, McLean, VA (US)

(72) Inventors: Jeffrey Rule, Chevy Chase, MD (US); Edward Joseph, McLean, VA (US); Matthew Kloster, Falls Church, VA (US); Gavin Hickey, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 264 days.

(21) Appl. No.: 18/395,031

(22) Filed: Dec. 22, 2023

(65) Prior Publication Data

US 2025/0211584 A1 Jun. 26, 2025

(51) Int. Cl.
*H04L 9/40* (2022.01)

(52) U.S. Cl.
CPC ............ *H04L 63/083* (2013.01); *H04L 63/10* (2013.01)

(58) Field of Classification Search
CPC .............................. H04L 63/083; H04L 63/10
See application file for complete search history.

(56) References Cited

U.S. PATENT DOCUMENTS 10,382,426 B2 8/2019 Falodiya
10,721,226 B1 7/2020 Kurani et al.
10,862,880 B1 12/2020 Massicotte
2008/0134295 A1* 6/2008 Bailey ..................... G06F 21/30 726/4
2014/0150079 A1* 5/2014 Le Nerriec ........... G06F 3/0484 726/8
2015/0235206 A1 8/2015 Murphy, Jr. et al.
2016/0294813 A1* 10/2016 Zou ..................... H04L 63/0815
2017/0012951 A1 1/2017 Mennes et al.
2018/0026959 A1 1/2018 Votaw et al.
2018/0183789 A1* 6/2018 Tischart .............. H04L 63/0272
2018/0219891 A1* 8/2018 Jain ..................... H04L 63/1425
2020/0151724 A1* 5/2020 Edwards .......... G06Q 20/38215

(Continued)

OTHER PUBLICATIONS

Anna Hrushka, "EWS Readies Paze to Help Banks Take on Digital Wallet Market," Banking Dive, Apr. 3, 2023. 8 pages, https://www.bankingdive.com/news/ews-paze-june-launch-digital-wallet-market-james-anderson-apple-pay-cash-app-venmo/646633/.

*Primary Examiner* — Catherine Thiaw
*Assistant Examiner* — Nega Woldemariam
(74) *Attorney, Agent, or Firm* — Foley & Lardner LLP

(57) ABSTRACT

In some embodiments, a network operation may be authenticated via a dynamic selection of an access token. In some embodiments, use of a software application, configured to store a set of access tokens, in connection with processing a network operation may be detected. A risk value associated with each access token of the set of access tokens may be received in response to providing the network operation to a set of entities associated with the set of access tokens. Based on a determination, for each access token of the set of access tokens, whether the risk value associated with the access token satisfies a threshold risk value, the network operation may be authenticated using a selected access token associated with a first risk value that satisfies the threshold risk value.

16 Claims, 5 Drawing Sheets

(56) References Cited

U.S. PATENT DOCUMENTS

| | | | | |
|---|---|---|---|---|
| 2020/0285978 | A1* | 9/2020 | Chen | G06N 20/00 |
| 2020/0366682 | A1* | 11/2020 | Aggarwal | H04L 63/105 |
| 2021/0224799 | A1* | 7/2021 | Ongpin | H04L 63/083 |
| 2021/0286861 | A1* | 9/2021 | Churchill | G06F 21/31 |
| 2022/0067703 | A1* | 3/2022 | Sarin | G06Q 20/322 |
| 2023/0043757 | A1 | 2/2023 | Joshi et al. | |
| 2025/0023878 | A1* | 1/2025 | Sathaye | G06F 9/547 |
| 2025/0097208 | A1* | 3/2025 | Terao | H04L 63/0807 |
| 2025/0133073 | A1* | 4/2025 | Chilamakuri | H04L 63/083 |
| 2025/0141926 | A1* | 5/2025 | Jain | H04L 63/105 |
| 2025/0211584 | A1* | 6/2025 | Rule | H04L 63/10 |
| 2025/0278515 | A1* | 9/2025 | Watkins | H04L 63/10 |

* cited by examiner

Display component(s) 202

Input component(s) 204

Communication component(s) 208

Processor(s) 206

Sensor(s) 210

Storage(s) 212

Application(s) 214

Application 214a

Application 214b

...

Application 214N

SYSTEMS AND METHODS FOR AUTHENTICATING NETWORK OPERATIONS VIA DYNAMIC SELECTION OF ACCESS TOKENS

SUMMARY

Methods and systems are described herein for improvements related to authenticating network operations (e.g., via dynamic selection of access tokens). As one example, methods and systems are described herein for selecting an access token to authenticate a network operation based on a risk value associated with the token.

Access tokens enable users to access resources available via one or more entities. For example, in the context of web services, in response to a user logging into a web service (e.g., a network operation) via a user device, the web service may issue a token (e.g., a JSON web token or other token) the includes credentials of the user to the user device. Each subsequent request of the user device to the web service will include the token, allowing the user to access services and other resources that are permitted with that token based on an authorization of the request. As another example with respect to multi factor authentication tokens, such as two-factor authentication tokens, in addition to a user providing a password at a login page of a website (e.g., via manual means or automatically via a JSON web token), the two-factor authentication token, which is associated with the website, may generate a code, where such code is then used to supplement the previously provided password to enable access to resources hosted by the website.

In some cases, multiple access tokens may be linked to an account of a user to authenticate a network operation. For instance, a first access token and a second access token may be configured to provide credentials to log into an account of a user. The first access token and the second access token, however, may differ from one another as the first access token may be issued by a first entity that provides authentication of user credentials and the second access token may be issued by a second entity that provides authentication of user credentials. However, each token (e.g., the first and second access token) may have different authentication processes to authenticate the user's credentials, such as two factor authentication and three factor authentication, due to one or more authentication protocols that the entity uses to authenticate user credentials. Therefore, when multiple access tokens are available for use to authenticate network operations, a determination must be made to select which access token to use for authenticating a network operation.

However, existing systems have no mechanism to select an access token among multiple access tokens. For example, existing systems currently rely on access token identifiers and their respective association to a user's account. For instance, where a given token is linked to a user's social media account, existing systems may simply select that token each time when the user is logging into their social media account. When multiple access tokens with varying authentication protocols/processes are linked to a user or the users account, existing systems have no way of differentiating one token from another that is linked to the same user account, and therefore, may cause one or more errors to occur when attempting to select one token amongst a set of tokens. Furthermore, existing systems have no mechanism to select the "best" or "most secure" access token. For example, where one access token is a single-factor authentication token and another access token is a two-factor authentication token, existing systems do not have the available data to differentiate between access token security strength. This in turn may reduce network operation authentication security as a less secure access token may be selected over a more secure access token to authenticate the network operation.

Further exacerbating this problem, even if existing systems had a mechanism to select an access token amongst multiple access tokens, there is no common place to do so. For example, as each access token may be stored within a secure storage associated with a software application specially configured to store such access tokens, each software application may be siloed from each other (e.g., as they store credential-related information of access tokens), thereby preventing any comparison of such access tokens to another.

To overcome these technical challenges described above, in some embodiments, dynamic access token selection may be implemented. For example, the system may (i) provide a software application that is configured to store a set of access tokens, and (ii) select an access token from the set of access tokens based on received risk values associated with the access tokens. As discussed above, existing systems currently do not have (i) a common place to compare access tokens nor (ii) available data to base a selection of an access token amongst a set of access tokens. To overcome this, the system may provide a software application (e.g., a token storage application, a token vault, etc.) that is configured to store a set of access tokens where each access token of the set of access tokens may be associated with an entity which provided the access token. By providing the software application, each access token may be stored in a common location to enable a comparison between each access token of the set of access tokens.

The system may detect use of the software application in connection with a processing of a network operation (e.g., a log in request), and may provide the network operation to each entity associated with the access tokens. For instance, as each entity (and access tokens) may be associated with different authentication processes (e.g., single factor, two factor, tri factor, etc.), to select the most secure authentication token for the given network operation, the system may provide the network operation to each entity associated with the stored access tokens to receive a risk value of the access token. For example, the risk value may indicate a level of risk, or an authentication strength of a respective access token for the given network operation. By providing the network operation to each entity, each entity may provide a risk value indicative of a security strength or security allocation with respect to the network operation.

The system may then determine for each access token of the set of access tokens whether the risk value associated with a respective access token satisfies a threshold risk value. For example, the threshold risk value may be a dynamic threshold risk value that is based in part on the network operation. For example, where the network operation is a social media account login request, the threshold risk value may be lower than that of where the network operation is a bank account login request. The system may then select an access token among the set of access tokens to authenticate the network operation where the selected access token has a risk value that satisfies the threshold risk value. For instance, as higher authentication strength authentication processes, such as three-factor authentication processes, require multiple factor validations as opposed to lower authentication strength authentication processes, such as one factor authentication processes, the system may select the most secure access token for authenticating the network operation. Additionally, in this way, not only may the system select the most secure access token for authenticating the network operation, but may also select the most efficient access token to authenticate the network operation (e.g., as the threshold risk value may be based in part on the network operation), thereby reducing the amount of wasted computational resources required to authenticate network operations associated with a low risk value/authentication strength value.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
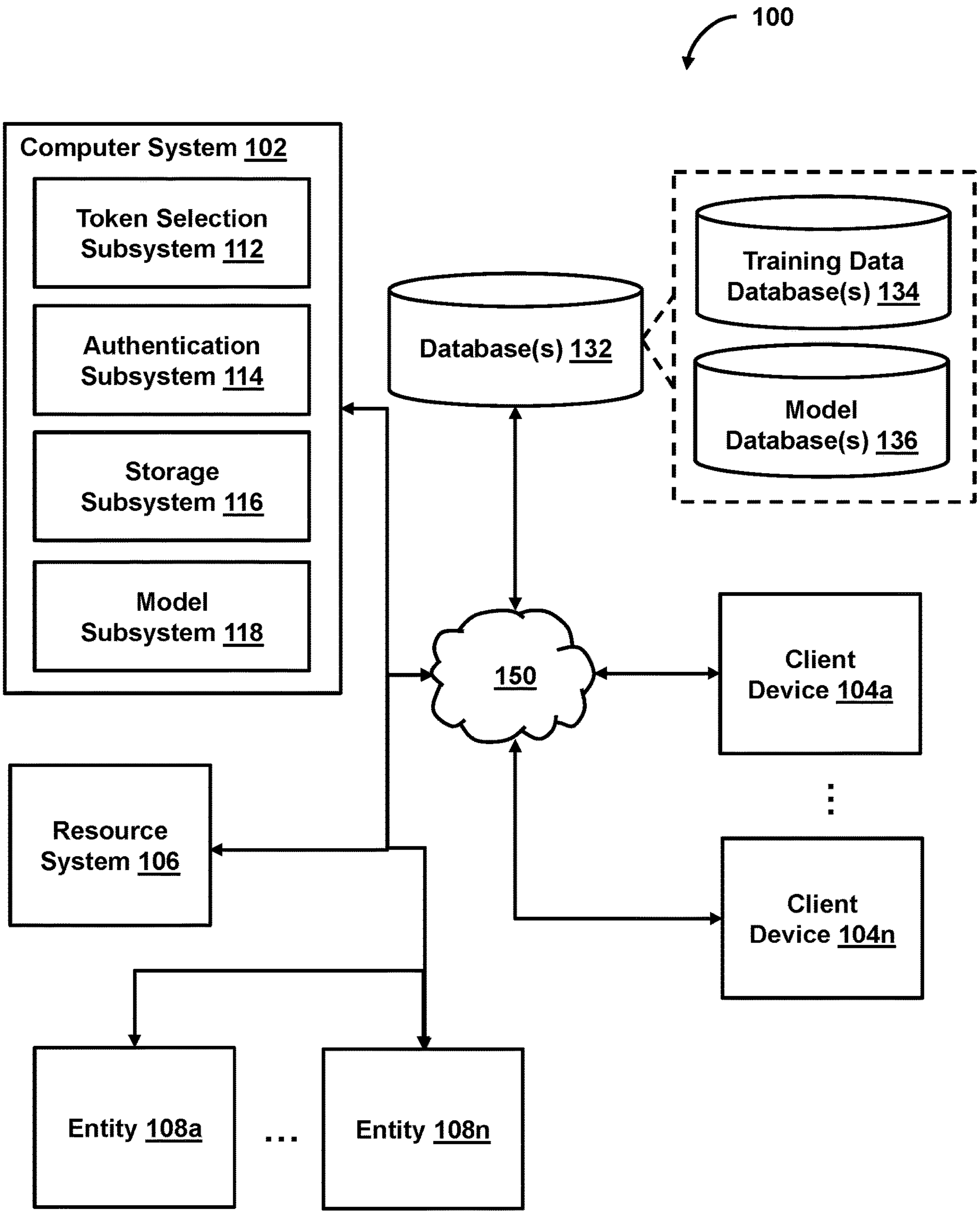
FIG. 1 shows a system for authenticating network operations, in accordance with one or more embodiments.

FIG. 1 shows a system 100 for authenticating network operations, in accordance with one or more embodiments. As shown in FIG. 1, system 100 may include computer system 102, client device 104 (or client devices 104*a*-104*n*), resource system 106, entity 108 (or entities 108*a*-108*n*), or other components. Computer system 102 may include token selection subsystem 112, authentication subsystem 114, storage subsystem 116, model subsystem 118, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may select an access token for use in authenticating the network operation. As an example, use of a software application configured to store a set of access tokens may be detected in connection with a processing of a network operation. The software application may be a token storage software application that is configured to securely store a set of access tokens (e.g., in a secure memory, a hardware security module (HSM), etc.). Each access token of the set of access tokens may be associated with an entity. For example, an entity may be any company, merchant, service provider, organization, bank, issuing bank, or other entity that is associated with or provides the access token.

System 100 may provide the network operation to each entity associated with each access token to receive a risk value associated with each access token. A network operation may be any operation that is (i) transmitted over one or more communication networks, or (ii) requests access to a resource. For example, a network operation may be a login request to enable a user access to a social media account. By providing the network operation to each entity associated with each access token of the set of access tokens, the entities may provide a risk value associated with the respective access token. The risk value may indicate a security strength value of an access token, which may be a percentage, an integer, a decimal, or other value.

Upon receiving the risk values of each access token of the set of access tokens, system 100 may determine for each access token, whether the risk value for the access token satisfies a threshold risk value. For example, the threshold risk value may be a threshold value, such as a percentage, integer, decimal, or other value. In some embodiments, the threshold risk value may be a range of values. By determining whether the risk value associated with a given access token satisfies a threshold risk value, the system may ensure that the most secure access token is selected for use in authenticating network operations, thereby increasing network operation authentication security. System 100 may select an access token from the set of access token that has a risk value that satisfies the threshold risk value to authenticate the network operation. For example, authenticating the network operation may be a process that enables access to a resource. For instance, where the network operation is a login request to a social media account of the user, the system may use data (e.g., a two factor authentication code) of the selected access token to supplement a password of the user when logging into the social media account of the user, thereby enabling access to the user's social media account. In this way, by determining whether the risk value associated with a given access token satisfies the threshold risk value, the system may select the most efficient access token to authenticate the network operation, thereby reducing the amount of wasted computational resources required to authenticate network operations that are associated with a low risk value.

Subsystems 112-118

In some embodiments, token selection subsystem 112 may detect use of a software application in connection with processing a network operation associated with accessing a resource. For example, the software application may be stored on client device 104, where a user is accessing a resource via client device 104. In one use case, the user may interact with a mobile device of the user (e.g., client device 104) to log into a social media account of the user. Token selection subsystem 112 may detect use of the software application when the user is logging into their social media account. When the user is logging into their social media account, the software application may be used by the user to provide an authentication code to authenticate a login request. However, as the software application is configured to store a set of access tokens that enable access to one or more resources (e.g., the social media account of the user), token selection subsystem 112 may determine an access token to authenticate the login request.

Figure 2:
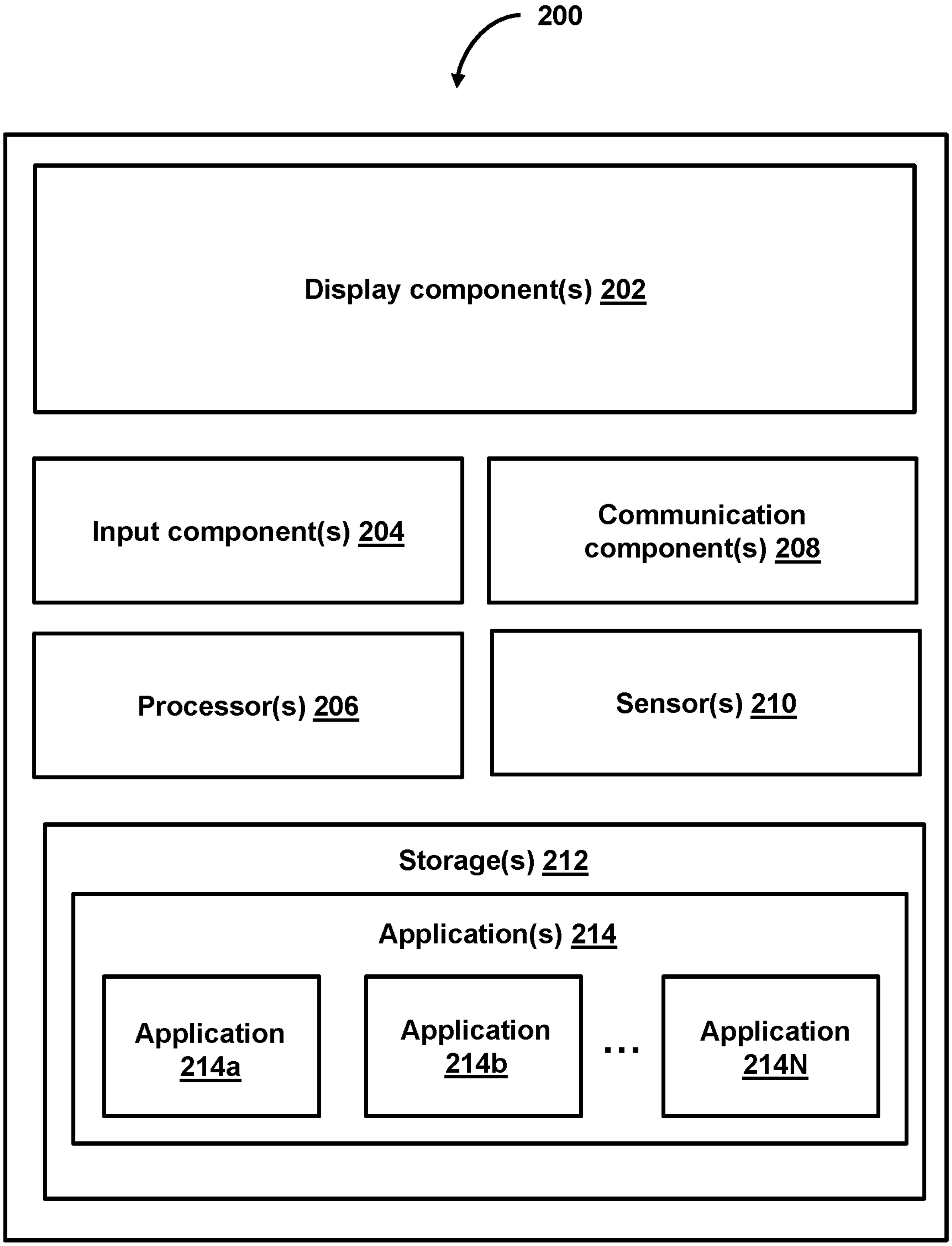
FIG. 2 shows an illustrative diagram of one or more components of a user device, in accordance with one or more embodiments.

In some embodiments, with respect to FIG. 2, one or more operations related to authenticating network operations via dynamic selection of access tokens may be performed by client device 200. For example, one or more components or subsystems of computer system 102 (FIG. 1) may be accessible or part of client device 200. In some embodiments, client device 200 may correspond to client device 104 (FIG. 1). Client device 200 may include a plurality of components, such as display component(s) 202, input component(s) 204, processor(s) 206, communication components(s) 208, sensors(s) 210, storage(s) 212, application(s) 214, or other components. In some embodiments, storage 212 may store a variety of applications. For example, applications 214*a*-214*n* may represent different applications stored on client device 200. Application 214*a* may be an application that is configured as a web browser for accessing resources over network 150. Application 214*b* may be configured to store a set of access tokens, consistent with one or more embodiments. Communication components 208 may be configured for receiving one or more messages (e.g., text messages, emails, notifications, mobile notifications, etc.) or other data (e.g., access tokens, risk values, etc.) that may be displayed to a user via display components 202, in accordance with one or more embodiments. It should be noted that “client device” and “user device” may be used interchangeably and may refer to one or more of the same devices or one or more different devices, based on context of the discussion.

In one use case, referring back to FIG. 1, in the context of authenticating or authorizing transactions, a user may use a user device associated with the user (e.g., a mobile phone, computer, wearable device, etc.) to complete a transaction. In some embodiments, the transaction may relate to an item, payment, or other transaction. For example, the item may be any physical or digital asset, such as a toothbrush, vehicle, a non-fungible token (NFT), or other asset. As another example, a payment may be to access a service, such as a multimedia streaming account, a cellular subscription service, or other service. The transaction may include an identifier identifying an item/service, a total amount (e.g., to be paid), amounts of individual items, or other information. When the user is to complete a transaction, the user may open a digital wallet application (or the digital wallet application may open automatically in response to detecting the user is checking out) on the user device to select one or more virtual payment cards (e.g., an access token) stored within the digital wallet application (e.g., the software application) to complete the transaction (e.g., a network operation). As each virtual payment card (VC) may be available for use in completing the transaction (e.g., authenticating the network operation), token selection subsystem 112 may detect use of the digital wallet application to select a VC for use in completing the transaction.

In some embodiments, each access token of the set of access tokens may be associated with an authentication process to authenticate the network operation. For example, an authentication process may be a single factor authentication process, a two factor authentication process, a three factor authentication process, a biometric authentication process, or other authentication process. In the context of authenticating transactions, each token may be associated with a 3-D secure (3DS) transaction protocol, a strong customer authentication (SCA) protocol, payment services directive (PSD), PSD1, PSD2 or other authentication protocol or process.

In some embodiments, in response to providing the network operation to a set of entities associated with the set of access tokens, authentication subsystem 114 may receive, from each entity of the set of entities, a risk value associated with each access token of the set of access tokens associated with the entity. Token selection subsystem 112 may provide the network operation to authentication subsystem 114, which authentication subsystem 114 may provide the network operation to the set of entities associated with the set of access tokens. For example, each access token may be associated with an entity which is related to the access token. For instance, an entity, such as a social media account service provider, may issue or otherwise configure an access token (e.g., a two factor authentication token) for use in authenticating login requests or providing access to other account services. As another example, where the entity is an issuing bank, the issuing bank may issue one or more VC’s to the user.

As existing systems currently have no mechanism for selecting the most secure access token, authentication subsystem 114 may transmit a request for a risk value associated with the access token to the entity associated with the access token (e.g., entity 108). In some embodiments, the request may include (i) a request for the risk value, and (ii) the network operation. Entity 108 may receive the request and may process the request to return a risk value associated with the access token. For example, authentication subsystem 114 may receive the risk values associated with each access token of the set of access tokens. In this way, the system obtains risk levels of given access tokens to enable a dynamic selection of access tokens, thereby improving network operation authentication security.

In the context of authenticating transactions, where the access tokens are VCs and the entities associated with the VCs are issuing banks (e.g., banks who have issued the VC or other payment card), authentication subsystem 114 may transmit the transaction that is to be completed to each issuing bank associated with each VC stored in the digital wallet application to receive a risk value associated with the VC. The risk value may indicate a fraud allocation value (e.g., a fraud allocation level, a fraud allocation percentage, etc.). For example, the fraud allocation value may be a value that indicates a percentage of fraud that the issuing bank is willing to cover. Where a fraud allocation value is 80%, the remaining 20% may be covered by an acquiring bank (e.g., a bank associated with a merchant selling a product to be purchased or a service to be paid for). Such fraud allocation values may indicate a monetary percentage of a transaction that a given bank will cover in the case that a transaction is discovered to be fraudulent. For example, where the fraud allocation value is 80% of a $100 transaction, then the issuing bank will guarantee or otherwise cover $80 of that transaction if it is later determined that the transaction is a fraudulent transaction. By providing the transaction to be completed to each issuing bank associated with each VC the user has access to, the issuing banks may compete for the transaction. That is, each issuing bank may provide fraud allocation values based on the transaction to incentivize the user for choosing a respective issuing bank's VC to complete the transaction, thereby improving the user experience as the user may be protected from fraudulent transactions.

In some embodiments, the network operation may include (i) user specific information associated with a user requesting access to a resource, and (ii) a resource identifier. For example, in the context of authenticating network operations (e.g., login requests), authentication subsystem 114 may provide (i) an indication that the operation is a login request, and (ii) a username or name of the user to the entity that issued the access token to enable the entity to provide a risk value associated with the access token. As another example, in the context of authenticating transactions, authentication subsystem 114 may provide (i) the transaction, (ii) personal information of the user requesting access to a product or resource (e.g., PII, demographical information, etc.), or (iii) a resource identifier (e.g., an identifier of what the user is requesting access to, a SKU, a UPC, a barcode, etc.) to the issuing bank to enable the issuing bank to process such information to provide the risk value associated with a given VC. As such, when the issuing bank provides the fraud allocation value, the fraud allocation value may be based, at least in part, on the user specific information of the user and the resource identifier.

In some embodiments, token selection subsystem 112 may determine, for each access token of the set of access tokens, whether the risk value associated with the access token satisfies a threshold risk value. For example, to ensure the most secure (or otherwise, most efficient) access token is selected for authenticating a network operation, token selection subsystem 112 may determine which access tokens of the set of available access tokens satisfy a threshold risk value. The threshold risk value may be a predetermined percentage, decimal, integer, ratio, or other value. In some embodiments, the threshold risk value is satisfied when a risk value fails to meet or exceed the threshold risk value. For example, in the context of authenticating login requests, a threshold risk value may be 40% (e.g., indicating that an access token may not be any more than 40% "risky" or insecure). In some embodiments, the threshold risk value is satisfied when a risk value meets or exceeds the threshold risk value. For example, in the context of authenticating transactions, a threshold risk value (e.g., threshold fraud allocation value) may be 70% (e.g., indicating that the VC must be associated with an issuing bank that is willing to take on 70% or more of a fraudulent transaction). In yet other embodiments, the threshold risk value may be a range. For example, where the threshold risk value is a range, the threshold risk value may be satisfied when a risk value is within the specified range of the threshold risk value. In this way, the system may determine which access tokens are the most secure when selecting an access token to authenticate network operations, thereby improving network operation authentication security.

In some embodiments, the threshold risk value may be a dynamic threshold risk value. For example, a dynamic threshold risk value may be based, at least in part, on the network operation. For example, in the context of social media account login requests, the threshold risk value may be 40%. However, for banking account login requests, the threshold risk value may be 90%. In this way, the system may increase the threshold risk value based on the network operation, thereby improving network operation authentication security. As another example, in the context of authenticating transactions, a dynamic threshold risk value may be based on a transaction amount associated with the transaction. For example, where a transaction amount for the transaction is below a transaction amount threshold (e.g., a predetermined monetary value), the system may use a first threshold risk value. However, where the transaction amount for the transaction meets or exceeds the transaction amount threshold, the system may use a second threshold risk value (e.g., that may be greater than that of the first threshold risk value).

In some embodiments, the authentication subsystem 114 may provide additional information to an entity associated with an access token of the set of access tokens that fails to satisfy the threshold risk value. For example, as each access token may be used to authenticate a network operation, entities associated with the access token may leverage additional information about the user to authenticate the network operation.

For instance, an access token that authenticates access to a social media account of a user with two factor authentication may only be able to provide a certain degree of authentication security (e.g., to accurately identify a user) as 2-factor authentication is based on what you know and what you have. However, malicious users may memorize passwords of one user and may obtain the authentication device to gain access to the user's account. To overcome this security flaw and increase user account security, when an access token is unavailable for use for authenticating a network operation (e.g., as the authentication process associated with an access token may not satisfy the threshold risk value), authentication subsystem 114 may provide additional user-specific information to the entity (e.g., entity 108) to which the access token is associated with to verify the identity of the user, thereby increasing network operation authentication security. In some embodiments, the user specific information may be answers to additional security questions, biometrics, or a photograph of the user taken in real time by a user device associated with the user. The entity associated with the access token may process such additional information and may provide an updated risk value associated with the access token, thereby enabling use of the access token to authenticate the network operation.

In another use case, where the access token is a VC, and the entity associated with the virtual card is an issuing bank, the authentication subsystem 114 may provide additional information of the user to the issuing bank (e.g., entity 108). For example, where the fraud level that the issuing bank is willing to take on (e.g., fraud allocation) is small (e.g., does not satisfy a threshold level of fraud allocation), the system may provide additional information of the user to the issuing bank. The issuing bank may leverage the additional information (e.g., a photograph of the user, answers to security questions associated with the user, or other information) to update the risk value associated with the virtual card. In this way, the user is incentivized on providing additional information to the issuing banks, and the issuing banks can leverage such additional information to provide use of their virtual card to complete a transaction, thereby improving the user experience while enhancing virtual card security.

In some embodiments, the authentication subsystem 114 may generate a new access token. For example, in response to determining that a given risk value associated with a given access token fails to satisfy the threshold risk value, the authentication subsystem 114 may generate a new access token associated with the entity associated with the given access token. Where a current access token is not a token to be used for authenticating the network operation (e.g., as the access token may be insecure or fail to provide an adequate security strength level/level of risk), the authentication subsystem 114 may generate a new access token for use in authenticating the network operation.

In one use case, where the access token is a virtual card and the given risk value is a level of fraud allocation associated with an issuing bank (e.g., to which issued the VC), the authentication subsystem 114 may generate a new VC associated with the issuing bank when the original VC fails to satisfy the threshold fraud allocation level. In some embodiments, the authentication subsystem 114 may provide a request to the issuing bank for a new VC in response to determining that the original VC fails to satisfy the fraud allocation threshold value. The system may receive a new VC from the issuing bank, where the new VC is associated with a fraud allocation value that satisfies the threshold fraud allocation value. As such, the virtual card may be stored in the software application (e.g., digital wallet) and may be available for use to complete a transaction. In this way, the system may generate or request a new access token that satisfies the threshold risk level, thereby enhancing network operation authentication security.

In some embodiments, the token selection subsystem 112 may use stored risk values to select an access token for use in authenticating a network operation. For example, the authentication subsystem 114 may store the received risk values associated with each access token in a database (e.g., storage subsystem 116) or a storage associated with a user device of a user (e.g., client device 104). When a second network operation associated with accessing a second resource is detected, the system may attempt to obtain updated risk values associated with each access token of the set of access tokens. However, if the system detects a failure to receive, from each entity of the set of entities, an updated risk value associated with each access token of the set of access tokens associated with the entity (e.g., due to an error, a computing network failure, etc.), the system may use the stored risk values when determining which access token to select to authenticate the second network operation. In this way, the system may facilitate network operation authentication when updated risk values fail to be received, thereby improving the user experience.

In some embodiments, token selection subsystem 112 may select an access token associated with a risk value that satisfies the threshold risk value of the set of access tokens to authenticate the network operation. For example, authenticating the network operation may enable access to a resource. For example, upon selecting an access token, token selection subsystem 112 may use the access token to authenticate the network operation to access a resource hosted at resource system 106. In the context of authenticating a login request, token selection subsystem 112 may select an access token (e.g., a two factor authentication token) of the set of access tokens that satisfies the threshold risk value to be used for logging in the user. As an example, as a two factor authentication token provides a secure code that supplements a user-provided password to log a user into an account associated with the user, token selection subsystem 112 may select an access token that satisfies the threshold risk value to use the secure code to log in the user at resource system 106. For instance, the access token (or information derived from the access token, such as the code) may be provided to the entity (e.g., entity 108) to which the access token corresponds to authenticate the (i) the password and (ii) the code from the access token. Upon successful authentication, the user is then able to access their user account at resource system 106, which hosts the users account to log the user into their account.

As another example, in the context of completing a transaction, token selection subsystem 112 may select a VC from a set of VC's to complete a transaction, where the selected VC satisfies a fraud allocation threshold value. Upon selecting a VC, token selection subsystem 112 may use the selected VC (or information derived from the VC, such as card details, expiration dates, cardholder name, security codes, etc.) to authenticate the transaction. For example, where the transaction is to purchase an item from a merchant (e.g., resource system 106), token selection subsystem 112 may provide the card details to the issuing bank that issued the selected access token to authenticate or authorize the transaction, thereby enabling the user access to the item at the merchant. In this way, the system enhances transaction processing security while reducing the amount of fraud that an acquiring bank must take on when processing a transaction.

As yet another example, token selection subsystem 112 may select a first VC over a second VC. For example, where the first VC is associated with a fraud allocation value of 68%, the second VC is associated with a fraud allocation value of 84%, and the threshold fraud allocation value is 70%, token selection subsystem 112 may select the second VC over the first VC for use in completing the transaction. However, where the threshold fraud allocation value is 50%, both of the first VC and the second VC satisfy the threshold fraud allocation value. In such case, in some embodiments, token selection subsystem 112 may select the second VC based on having a fraud allocation value that is greater than that of the first VC. As such, the system may select a VC for use in completing a transaction when two or more VC's that are eligible for completing the transaction are available, thereby reducing user choice overload.

In some embodiments, token selection subsystem 112 may determine a subset of access tokens available to authenticate the network operation. For example, token selection subsystem 112 may determine, for each access token of the set of access tokens, whether the risk value associated with the access token satisfies the threshold risk value. In some embodiments, the threshold risk value may be satisfied where a risk value fails to meet or exceed the threshold risk value (e.g., where the threshold risk value indicates a minimum level of "risk" or security strength value associated with access tokens available to authenticate or provide access to a resource). For instance, where a first access token is associated with a risk value of 20%, a second access token is associated with a risk value of 30%, a third access token is associated with a risk value of 75%, and the threshold risk value is 35%, the system may determine that the first access token and the second access token are available for authenticating the network operation. Token selection subsystem 112 may then select either the first access token or the second access token to authenticate the network operation. In this way, the system may provide access tokens that are deemed low risk as a choice to authenticate network operations, thereby increasing network operation authentication security.

Figure 3:
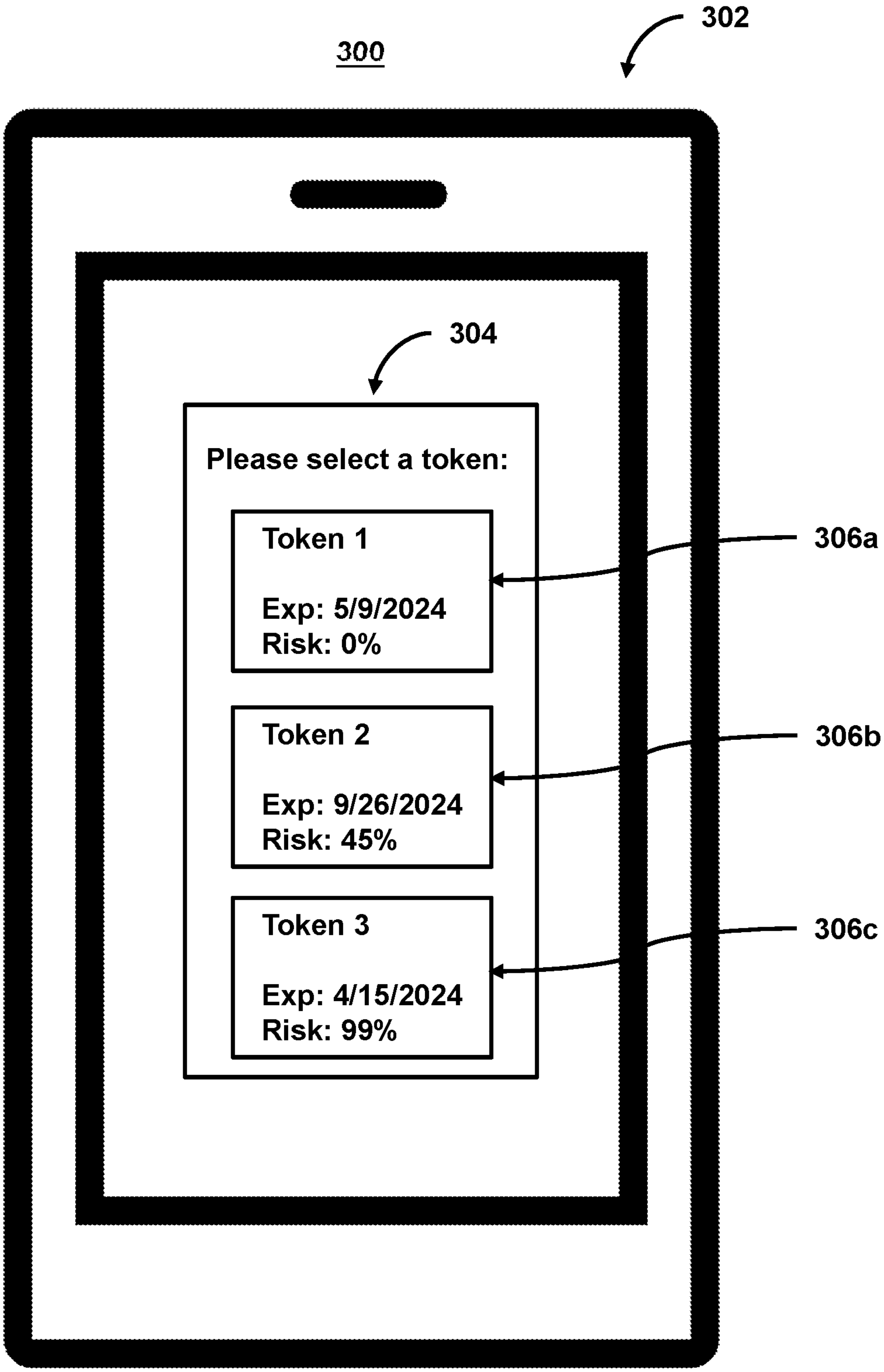
FIG. 3 shows an illustrative user interface, in accordance with one or more embodiments.

Referring to FIG. 3, which shows an illustrative user interface of a user device 302, token selection subsystem 112 may generate for display user interface 304. For example, user interface 304 may include visual indications of the set of access tokens (e.g., visual indication 306*a*-306*c*). In some embodiments, token selection subsystem 112 may generate for display the subset of access tokens available to authenticate the network operation. It should be noted that more or less visual indications of the set of access tokens may be shown, and that user interface 304 is merely exemplary. In this way, by generating a user interface, including visual indications of the set of access tokens, a user is enabled to select an access token for use in authenticating network operations, thereby improving the user experience.

In one use case, where the access token is a VC, and the risk value is a level of fraud that an issuing bank is willing to accept when authorizing a transaction, token selection subsystem 112 may determine a subset of virtual cards to be used to complete a transaction. For example, token selection subsystem 112 may determine whether the level of fraud for each virtual card of a set of virtual cards (e.g., stored in a digital wallet application of a user device or in storage subsystem 116) satisfies a threshold level of fraud. In some embodiments, the threshold risk value may be satisfied where a risk value meets or exceeds the threshold risk value (e.g., where the threshold risk value indicates a minimum amount of fraud that the issuing bank is willing to take on). The system may then select at least one virtual card from the set of virtual cards that satisfy the threshold risk value. In this way, the system may reduce the amount of virtual cards available to complete a transaction, thereby reducing user-choice overload.

In some embodiments, the token selection subsystem 112 may use an artificial intelligence model to select an access token from the subset of access tokens. For example, the token selection subsystem 112 may provide, for each access token of the subset of the set of access tokens, (i) the risk value associated with the access token, (ii) the access token identifier for the access token, and (iii) the threshold risk level to an artificial intelligence model (e.g., stored in model subsystem 118) to generate an output. The output may be an access token of the subset of the set of access tokens that is selected to authenticate the network operation. Additionally, or alternatively, the output may be an indication of an access token (e.g., an access token identifier) of the subset of the set of access tokens that is selected to authenticate the network operation.

The access token identifier may be a string, alphanumeric value, numerical value, hexadecimal value, or other value or values that identifies a given access token. The system may provide the risk values and the access token identifiers to the artificial intelligence model, with the threshold risk level to enable the artificial intelligence model to select an access token among the subset of the set of access tokens for use in authenticating the network operation.

In one use case, where the access tokens are virtual cards, the system may provide the virtual card identifiers, the risk value (e.g., fraud level) associated with the virtual cards, as well as the threshold risk level (e.g., fraud level) to the artificial intelligence model. The artificial intelligence model may generate an output indicating a virtual card for use in authenticating the network operation. In this way, the system may automatically select the most secure virtual card for use in completing a transaction without user input, thereby further reducing user-choice overload while increasing transaction security.

In some embodiments, model subsystem 118 may train or configure one or more artificial intelligence models to facilitate one or more embodiments described herein. For instance, token selection subsystem 112 may obtain a model (e.g., from model subsystem 118) or from model database 136. In some embodiments, such models may be used to select an access token from a set of access tokens. As an example, such models may be trained or configured to perform the foregoing functions by respectively mutually mapping input data and output data in nonlinear relationships based on learning (e.g., deep learning).

In some embodiments, the artificial intelligence models (otherwise known as prediction models) may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 4:
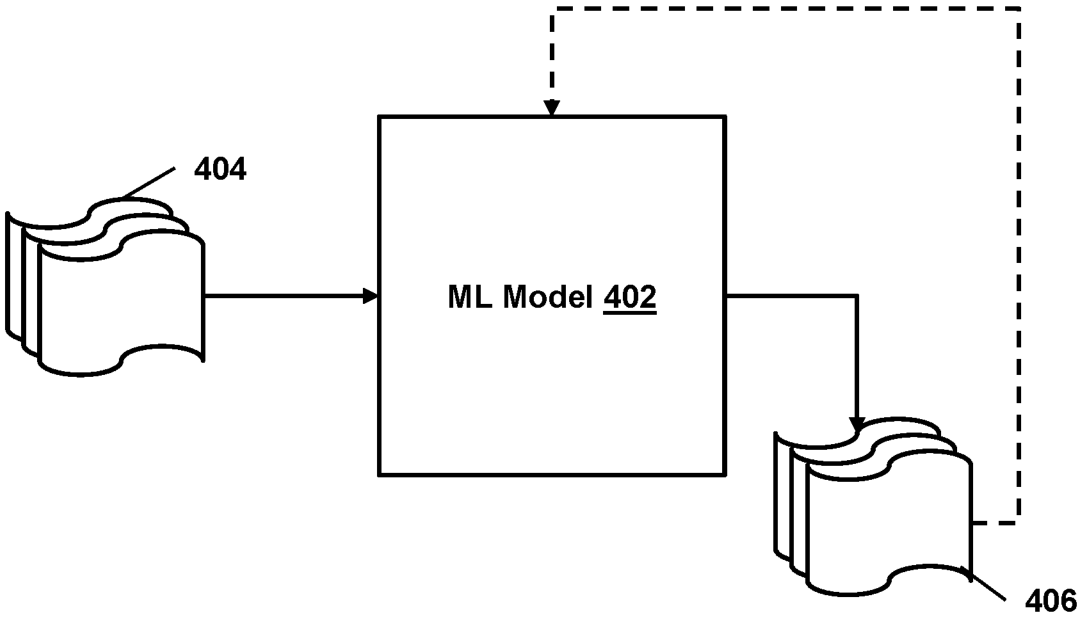
FIG. 4 shows an artificial intelligence model configured to select an access token, in accordance with one or more embodiments.

As an example, with respect to FIG. 4, machine learning model 402 may take inputs 404 and provide outputs 406. In one use case, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples, such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, as referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some embodiments, model subsystem 118 may receive training data to train an artificial intelligence model. For example, model subsystem 118 may receive training data from training data database 134, which may include (i) training routine risk values associated with training routine access tokens, (ii) a training routine threshold risk level, or (iii) training routine access token identifiers associated with the training routine access tokens. Such training data may be provided as input (e.g., inputs 404) to the artificial intelligence model (e.g., machine learning model 402) during a training routine to train the artificial intelligence model, which may generate outputs 406. Outputs 406 may indicate a training routine access token to select for use in authenticating network operations. For example, outputs 406 may indicate a training routine access token identifier. In some embodiments, outputs 406 may be compared to ground truth data (e.g., a correct output, labels indicating a correctly selected access token, etc.) to be provided back to machine learning model 402 as reference feedback information to further train machine learning model 402.

Referring back to FIG. 1, in some embodiments, token selection subsystem 112 may receive a user selection of an access token. For example, token selection subsystem 112 may generate for display, on a graphical user interface (GUI), of a user device (e.g., client device 104) associated with the user, the subset of the set of access tokens. A user may select one of the access tokens among the subset of the set of access tokens to use in authenticating the network operation. In this way, the system may enable a user to select an access token, or override the system's recommended access token to authenticate a network operation.

In one use case, where the access tokens are VCs, the system may generate for display on a GUI of a user device associated with the user, the subset of virtual cards available to complete a transaction (FIG. 3). Token selection subsystem 112 may then receive a user selection of a VC from among the subset of virtual cards available to complete the transaction. Additionally, or alternatively, token selection subsystem 112 may also generate for display other virtual cards (e.g., that are not part of the subset of virtual cards). In this way, the system enables a user selection of one or more virtual cards, even if one or more virtual cards are not recommended for use, thereby improving the user experience.

Example Flowcharts

Figure 5:
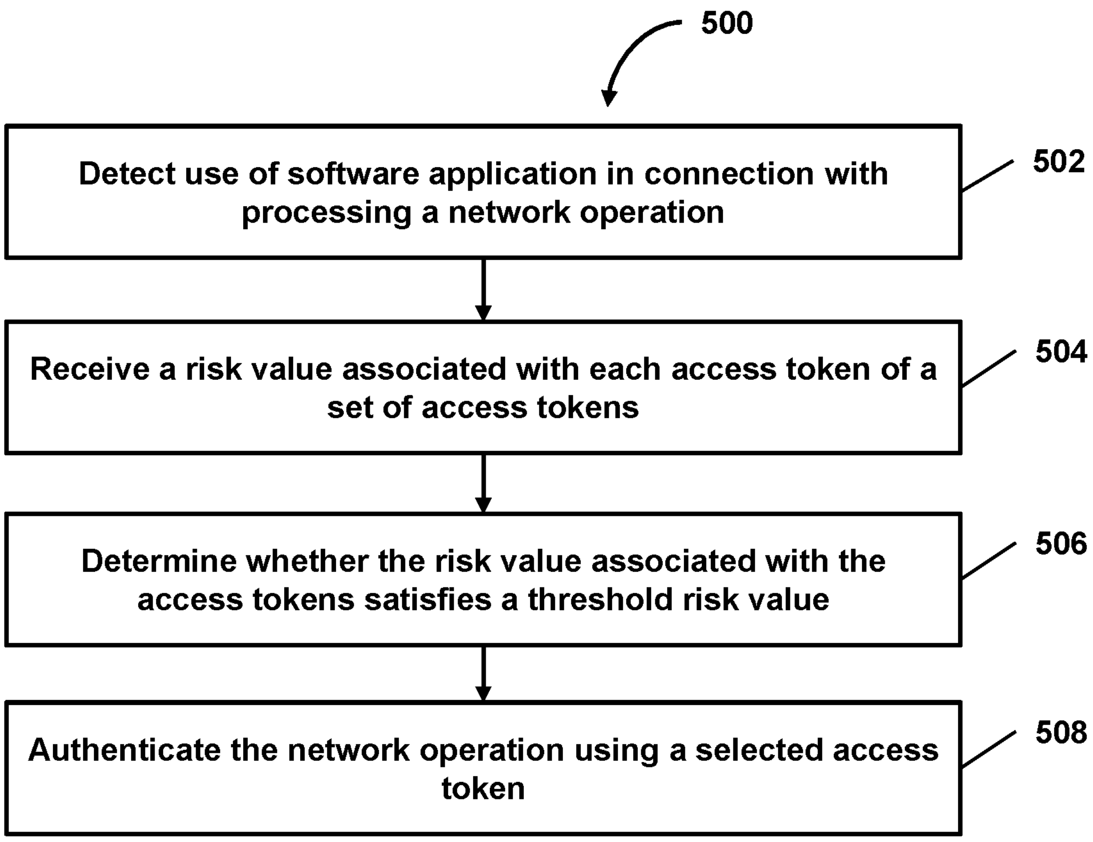
FIG. 5 shows a flowchart of a method for authenticating network operations via dynamic selection of access tokens, in accordance with one or more embodiments.

FIG. 5 is an example flowchart of processing operations of a method 500 that enable the various features and functionality of the system as described in detail above. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 502, use of a software application in connection with processing a network operation may be detected. For example, the software application may be configured to store a set of access tokens that enable access to one or more resources. As another example, the software application may be a digital wallet configured to store access tokens. The network operation may be any network operation that requests access to one or more resources. Operation 502 may be performed by a subsystem that is the same as or similar to token selection subsystem 112, in accordance with one or more embodiments.

In an operation 504, a risk value associated with each access token of a set of access tokens may be received. For example, in response to providing a network operation to a set of entities associated with a set of access tokens, a risk value, from each entity of the set of entities may be received. The risk value(s) may be associated with each access token of the set of access tokens that are associated with a respective entity. For example, the risk values may be used to dynamically select an access token for use in authenticating a network operation. Operation 503 may be performed by a subsystem that is the same as or similar to authentication subsystem 114, in accordance with one or more embodiments.

In an operation 506, a determination may be made as to whether the risk value associated with the access tokens satisfies a threshold risk value. For example, for each access token of the set of access tokens, a determination may be made as to whether a respective access token (e.g., of the set of access tokens) satisfies a threshold risk value. The threshold risk value may be a predetermined threshold risk value. In some embodiments, the threshold risk value may a dynamic threshold risk value, which may be based at least in part on the network operation. Operation 506 may be performed by a subsystem that is the same as or similar to token selection subsystem 112, in accordance with one or more embodiments.

In an operation 508, the network operation may be authenticated using a selected access token. For example, the network operation may be authenticated using the selected access token, where authenticating the network operation enables access to the resource. The selected access token may be an access token that is associated with a risk value that satisfies the threshold risk value of the set of access tokens. Operation 508 may be performed by a subsystem that is the same as or similar to token selection subsystem 112.

In some embodiments, the various computers and subsystems illustrated in FIG. 1 may include one or more computing devices that are programmed to perform the functions described herein. The computing devices may include one or more electronic storages (e.g., conversion database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-116 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: detecting use of a software application in connection with processing a network operation associated with accessing a resource, wherein the software application is configured to store a set of access tokens that enable access to one or more resources; in response to providing the network operation to a set of entities associated with the set of access tokens, receiving, from each entity of the set of entities, a risk value associated with each access token of the set of access tokens associated with the entity, wherein the network operation is provided to the set of entities associated with the set of access tokens; determining, for each access token of the set of access tokens, whether the risk value associated with the access token satisfies a threshold risk value; and authenticating the network operation to enable access to the resource using a selected access token associated with a first risk value that satisfies the threshold risk value of the set of access tokens.
2. The method of the preceding embodiment, wherein the selected access token is selected by: determining a subset of the set of access tokens to authenticate the network operation based on the risk value associated with the access token of the set of access tokens satisfying the threshold risk value; and selecting at least one access token from the subset of the set of access tokens as the selected access token.
3. The method of the preceding embodiment, further comprising: providing (i) the risk value associated with each access token of the subset of the set of access tokens, (ii) the threshold risk value, and (iii) an access token identifier for each access token of the subset of the set of access tokens to an artificial intelligence model to generate an output, the output indicating the selected access token.

4. The method of the preceding embodiment, further comprising: receiving training data to train the artificial intelligence model comprising (i) training routine risk values associated with training routine access tokens, (ii) a training routine threshold risk level, and (iii) training routine access token identifiers associated with the training routine access tokens; and providing the training data to the artificial intelligence model during a training routine to train the artificial intelligence model to generate a second output, the second output indicating a training routine access token to select for use in authenticating network operations.
5. The method of any of the preceding embodiments, wherein the at least one selected access token from the subset of the set of access tokens is selected by receiving, via a graphical user interface (GUI), a user selection of the selected access token, via a graphical user interface (GUI).
6. The method of any of the preceding embodiments, further comprising: providing the network operation to the set of entities associated with the set of access tokens, wherein the network operation comprises (i) user specific information of a user requesting access to the resource, and (ii) a resource identifier; and receiving, from each entity of the set of entities, the risk value associated with each access token of the set of access tokens associated with a respective entity of the set of entities, wherein the risk value is provided by the respective entity of the set of entities based on (i) the user specific information of the user and (ii) the resource identifier.
7. The method of any of the preceding embodiments, further comprising: in response to determining that a given risk value associated with a given access token fails to satisfy the threshold risk value, providing user specific information of a user requesting access to the resource to a respective entity associated with the given access token, wherein the given risk value associated with the given access token failing to satisfy the threshold risk value is determined; and receiving, from the respective entity associated with the given access token, an updated risk value associated with the given access token.
8. The method of any of the preceding embodiments, further comprising: in response to determining that a given risk value associated with a given access token fails to satisfy the threshold risk value, generating a new access token associated with a respective entity associated with the given access token, wherein the given risk value associated with the given access token failing to satisfy the threshold risk value is determined; and receiving from the respective entity associated with the new access token, a risk value associated with the new access token.
9. The method of any of the preceding embodiments, further comprising: in response to receiving, from each entity of the set of entities, the risk value associated with each access token of the set of access tokens associated with a respective entity of the set of entities, storing the risk value associated with each access token of the set of access tokens, wherein the risk value associated with each access token of the set of access tokens associated with the respective entity is received; and in response to detecting a failure to receive, from each entity of the set of entities, an updated risk value associated with each access token of the set of access tokens associated with the respective entity in connection with providing a second network operation to the set of entities associated with the set of access tokens, using the stored risk value associated with each access token of the set of access tokens associated with the respective entity to select a second access token to authenticate the second network operation, wherein the failure to receive the updated risk value is detected.
10. The method of any of the preceding embodiments, wherein the software application is a digital wallet application.
11. The method of any of the preceding embodiments, wherein the network operation is a transaction.
12. The method of any of the preceding embodiments, wherein the resource is an item.
13. The method of any of the preceding embodiments, wherein the risk value associated with each access token of the set of access tokens associated with the entity is a fraud allocation value.
14. The method of any of the preceding embodiments, wherein the entity is a bank.
15. The method of any of the preceding embodiments, wherein the set of access tokens is a set of virtual card numbers.
16. The method of the preceding embodiment, wherein each virtual card number of the set of virtual card numbers are associated with (i) a user and (ii) a bank that issued the respective virtual card number.
17. A tangible, non-transitory, machine-readable medium storing instructions that, when executed by a data processing apparatus, cause the data processing apparatus to perform operations comprising those of any of the foregoing method embodiments.
18. A system comprising: one or more processors; and memory storing instructions that, when executed by the processors, cause the processors to effectuate operations comprising those of any of the foregoing method embodiments.

What is claimed is:

1. A system for authenticating network operations via dynamic selection of access tokens, the system comprising:

one or more processors executing computer program instructions that, when executed, cause operations comprising:

detecting use of a software application in connection with processing a network operation associated with accessing a resource, wherein the software application is configured to store a set of access tokens, wherein each access token of the set of access tokens are issued by an issuing entity that enables access to the resource;

for each issuing entity associated with each access token of the set of access tokens, receiving a response from the issuing entity associated with the set of access tokens based on a transmission of the network operation to the issuing entity, wherein the response indicates a risk value of an authentication process associated with the access token of the set of access tokens that correspond to the issuing entity, and wherein the risk value is assessed by the issuing entity;

determining, for each access token of the set of access tokens, whether the risk value of the authentication process associated with the access token satisfies a threshold risk value to access the resource;

determining a subset of the set of access tokens to authenticate the network operation based on a subset of risk values of the authentication processes associated with the set of access tokens satisfying the threshold risk value; and providing, to a prediction model, (i) a subset of risk values associated with the subset of the set of access tokens, (ii) the threshold risk value, and (iii) a set of access token identifiers for the subset of the set of access tokens to generate an output, the output indicating a selected access token; and receiving, via a graphical user interface (GUI) on a user device associated with the software application, the selected access token to (i) authenticate the network operation, and (ii) access the resource.

2. A method comprising:

detecting, using one or more processors, use of a software application in connection with processing a network operation associated with accessing a resource, wherein the software application is configured to store a set of access tokens that enable access to one or more resources;

providing, using the one or more processors, the network operation to a set of issuing entities associated with the set of access tokens;

in connection with providing the network operation, for each issuing entity of the set of issuing entities, using the one or more processors:

receiving, from the issuing entity of the set of issuing entities, a risk value associated with an access token of the set of access tokens issued by the issuing entity, wherein the risk value is assessed by the issuing entity;

determining, using the one or more processors, a set of results by, for each access token of the set of access tokens, whether the risk value associated with the access token satisfies a threshold risk value;

determining, using the one or more processors, a subset of the set of access tokens to authenticate the network operation based on the set of results indicating that a set of risk values associated with the subset of the set of access tokens satisfy the threshold risk value;

providing, using the one or more processors, to a prediction model, (i) the set of risk values associated with the subset of the set of access tokens, (ii) the threshold risk value, and (iii) a set of access token identifiers for the subset of the set of access tokens to generate an output, the output indicating a selected access token; and authenticating the network operation, using the one or more processors, to enable access to the resource using the selected access token associated with a first risk value that satisfies the threshold risk value of the set of access tokens.

3. The method of claim 2, further comprising:

receiving training data to train the prediction model comprising training routine risk values associated with training routine access tokens, (ii) a training routine threshold risk level, and (iii) training routine access token identifiers associated with the training routine access tokens; and providing the training data to the prediction model during a training routine to train the prediction model to generate a second output, the second output indicating a training routine access token to select for use in authenticating network operations.

4. The method of claim 2, further comprising receiving, via a graphical user interface (GUI), a user selection of an additional selected access token, via the GUI.

5. The method of claim 2, further comprising:

providing the network operation to the set of issuing entities associated with the set of access tokens using the one or more processors, wherein the network operation comprises (i) user specific information of a user requesting access to the resource, and (ii) a resource identifier, and receiving, from each issuing entity of the set of issuing entities, the risk value associated with each access token of the set of access tokens issued by a respective entity of the set of issuing entities, wherein the risk value is provided by the respective entity of the set of issuing entities based on (i) the user specific information of the user, and (ii) the resource identifier.

6. The method of claim 2, further comprising:

in response to determining that a given risk value associated with a given access token fails to satisfy the threshold risk value, providing user specific information of a user requesting access to the resource to a respective issuing entity that issued the given access token, wherein the given risk value associated with the given access token failing to satisfy the threshold risk value is determined; and receiving, from the respective issuing entity that issued the given access token, an updated risk value associated with the given access token.

7. The method of claim 2, further comprising:

in response to determining that a given risk value associated with a given access token fails to satisfy the threshold risk value, generating a new access token associated with a respective issuing entity associated with the given access token, wherein the given risk value associated with the given access token failing to satisfy the threshold risk value is determined; and receiving from the respective issuing entity associated with the new access token, a risk value associated with the new access token.

8. The method of claim 2, further comprising:

in response to receiving, from each issuing entity of the set of issuing entities, the risk value associated with each access token of the set of access tokens issued by a respective issuing entity of the set of issuing entities, storing the risk value associated with each access token of the set of access tokens, wherein the risk value associated with each access token of the set of access tokens issued by the respective issuing entity is received; and in response to detecting a failure to receive, from each issuing entity of the set of issuing entities, an updated risk value associated with each access token of the set of access tokens issued by the respective issuing entity in connection with providing a second network operation to the set of issuing entities associated with the set of access tokens, using the stored risk value associated with each access token of the set of access tokens issued by the respective issuing entity to select a second access token to authenticate the second network operation, wherein the failure to receive the updated risk value is detected.

9. The method of claim 2, wherein each access token of the set of access tokens is associated with an authentication process to authenticate the network operation.

10. One or more non-transitory computer-readable media storing instructions, that when executed by one or more processors, cause operations comprising:

detecting use of a software application in connection with processing a network operation, wherein the software application is configured to store a set of access tokens that enable access to one or more resources;

for each issuing entity of a set of issuing entities associated with the set of access tokens:

receiving, from the issuing entity, a risk value associated with an access token of the set of access tokens, wherein the access token is issued by the issuing entity;

determining a subset of the set of access tokens to authenticate the network operation based on a set of risk values associated with the subset of the set of access tokens satisfying a threshold risk value, by determining, for each respective access token of the set of access tokens, whether the respective risk value associated with the access token satisfies the threshold risk value;

providing, to a prediction model, (i) the set of risk values associated with the subset of the set of access tokens, (ii) the threshold risk value, and (iii) a set of access token identifiers for the subset of the set of access tokens to generate an output, the output indicating a selected access token; and authenticating the network operation to enable access to a resource using the selected access token associated with a first risk value that satisfies the threshold risk value of the set of access tokens.

11. The one or more non-transitory computer-readable media of claim 10, the instructions further causing operations comprising:

receiving training data to train the prediction model comprising (i) training routine risk values associated with training routine access tokens, (ii) a training routine threshold risk level, and (iii) training routine access token identifiers associated with the training routine access tokens; and providing the training data to the prediction model during a training routine to train the prediction model to generate a second output, the second output indicating a training routine access token to select for use in authenticating network operations.

12. The one or more non-transitory computer-readable media of claim 10, further comprising receiving, via a graphical user interface (GUI), a user selection of an additional selected access token.

13. The one or more non-transitory computer-readable media of claim 10, the instructions further causing operations comprising:

providing the network operation to the set of issuing entities associated with the set of access tokens, wherein the network operation comprises (i) user specific information of a user requesting access to the resource, and (ii) a resource identifier; and receiving, from each entity of the set of issuing entities, the risk value associated with each access token of the set of access tokens issued by a respective entity of the set of issuing entities, wherein the risk value is provided by the respective entity of the set of issuing entities based on (i) the user specific information of the user, and (ii) the resource identifier.

14. The one or more non-transitory computer-readable media of claim 10, the instructions further causing operations comprising:

in response to determining that a given risk value associated with a given access token fails to satisfy the threshold risk value, providing user specific information of a user requesting access to the resource to a respective issuing entity associated with the given access token; and receiving, from the respective issuing entity associated with the given access token, an updated risk value associated with the given access token.

15. The one or more non-transitory computer-readable media of claim 10, the instructions further causing operations comprising:

in response to determining that a given risk value associated with a given access token fails to satisfy the threshold risk value, generating a new access token associated with a respective issuing entity that issued the given access token; and receiving from the respective issuing entity that issued the new access token, a risk value associated with the new access token.

16. The one or more non-transitory computer-readable media of claim 10, the instructions further causing operations comprising:

in response to receiving, from each entity of the set of issuing entities, the risk value associated with each access token of the set of access tokens issued by a respective entity of the set of issuing entities, storing the risk value associated with each access token of the set of access tokens; and in response to detecting a failure to receive, from each entity of the set of issuing entities, an updated risk value associated with each access token of the set of access tokens associated with the respective entity in connection with providing a second network operation to the set of issuing entities associated with the set of access tokens, using the stored risk value associated with each access token of the set of access tokens issued by the respective entity to select a second access token to authenticate the second network operation.

* * * * *